United States Patent [19]
Bleiweiss et al.

[11] Patent Number: 5,901,151
[45] Date of Patent: May 4, 1999

[54] SYSTEM FOR ORTHOGONAL SIGNAL MULTIPLEXING

[75] Inventors: Scott J. Bleiweiss, Upton; Thomas B. Hawkins, Boylston; James W. Espy, Andover, all of Mass.

[73] Assignee: Data General Corporation, Westborough, Mass.

[21] Appl. No.: 08/801,603

[22] Filed: Feb. 13, 1997

Related U.S. Application Data

[63] Continuation of application No. 08/748,884, Nov. 14, 1996
[60] Provisional application No. 60/012,358, Feb. 27, 1996.

[51] Int. Cl.⁶ ................... H04J 1/08; H04J 1/16; H04L 12/26
[52] U.S. Cl. ............ 370/480; 370/200; 370/248; 370/297
[58] Field of Search ................... 370/275, 281, 370/295, 297, 302, 480, 522, 527, 488, 493, 494, 495, 497, 200, 529, 242, 248; 375/257, 258; 381/1; 395/183.19, 183.2

[56] References Cited

U.S. PATENT DOCUMENTS

| | | | |
|---|---|---|---|
| 4,335,464 | 6/1982 | Armstrong | 375/270 |
| 4,677,686 | 6/1987 | Hustig et al. | 455/5 |
| 4,763,326 | 8/1988 | Krick | 370/527 |
| 4,803,727 | 2/1989 | Holt et al. | 381/1 |
| 5,371,743 | 12/1994 | DeYesso et al. | 371/8.1 |
| 5,432,786 | 7/1995 | Kawada | 370/480 |
| 5,485,488 | 1/1996 | Van Brunt et al. | 375/257 |

FOREIGN PATENT DOCUMENTS

| | | |
|---|---|---|
| 0112716A2 | 7/1984 | European Pat. Off. . |
| WO 95/13581 | 5/1995 | WIPO . |
| WO 95/27353 | 10/1995 | WIPO . |

OTHER PUBLICATIONS

"Ring datapath speeds 200–Mbyte/s transfers", Tom Williams, *Computers & Subsystems, Computer Design*, Aug. 1992, p. 42.

CIPRICO Annual Report, 1995.
CIPRICO Disk Arrays, Product Description, 1995.
CLARIION, Data General Corporation, Product Description, 1995.
"Disk Servers and RAID", A Comparative Overview from Computing Edge, Computing Edge Corporation, 1996.
"Tandem Expands Leading Fault–Tolerant Unix(r) Systems Offerings and Adds Complementary Servers and Workstations", Tandem Computers, Inc. Oct. 18, 1996. http://www.tandem.com/press–releases/integrity.html.
Integrity S4000 Servers: CO Models, Tandem Computers, Inc., Sep. 1995. http://www.tandem.com/INFOCTR/PROD_DES/Its4COPD/its4COPD.HTM.
Fibre Channel Association. http://www.Amdahl.com/ext/CARP/FCA/FCA.html.
"Channel Networking: Networking Flexibility with Channel Speeds Using . . . ", Fibre Channel. http://www.ancor.com/chnlnet.htm.
"High Availability: Stayin' Alive—High availability storage clusters offer customers near fault tolerance and offer VARs better margins than RAID", Peter Jordan, Apr. 15, 1996, 1966, CMP publications, Inc. http://192.216.191.76/cg . . . =125596&CO_CD=4&CO_TXT=Y.

(List continued on next page.)

*Primary Examiner*—Hassan Kizou
*Attorney, Agent, or Firm*—Bromberg & Sunstein LLP

[57] ABSTRACT

A high frequency signal and a low frequency signal are coupled onto a pair of conductors providing a communication link between two computer components. The high frequency signal may be a differentially coupled Fibre Channel 8B/10B encoded signal. A diplexer includes a low pass filter for attenuating the Fibre Channel signal and a high pass filter for separately attenuating the low frequency signal. A two-way communication link may be provided over twinax cable. An environmental monitor may be in connection with the low frequency communication path.

24 Claims, 9 Drawing Sheets

OTHER PUBLICATIONS

"Disk Array Reliability is Improving", Ann Miller, CMP Media, Inc. May 23, 1994. http://192.216.191.76/cg . . . =125888&CO_CD=1&CO_TXT=Y.

"Fibre Channel: The Digital Highway Made Practical", Tim Sutton, David Webb, Oct. 22, 1994, Seagate Technology Paper. http://www.seagate.com/s . . . r/fibchan/fibchant-p.html.

"Fibre Channel–Arbitrated Loop Active Hub", FCL1063TW, Product Description. http://www.gadzoox.com/FCL1063.htm.

Meltek FC–Array, Product Description. http://www.meltek.com/fibre/fca.html.

"Data Storage Just Got 10X Faster—Introducing Box Hill's Fibre Box™", Oct. 1996 Silicon Alley, Product Description. http://www.boxhill.com/fibrebox/press.html.

SYSTEM FOR ORTHOGONAL SIGNAL MULTIPLEXING

The present application is a continuation of copending U.S. patent application Ser. No. 08/748,884, filed Nov. 14, 1996. The present application further claims priority from U.S. Provisional application Ser. No. 60/012,358, filed Feb. 27, 1996. The full disclosure of these applications are incorporated by reference herein.

TECHNICAL FIELD

This invention relates to dynamically adding a disk array chassis to an already operating disk drive array, and communicating with the new disk array chassis over a communication path before the disk drives are interfaced on a high speed path with the disk drive controller.

BACKGROUND OF THE INVENTION

Subsystems comprising disk arrays, i.e., groups of small, independent disk drive modules used to store large quantities of data have been developed and found to possess many advantages over a single large disk drive. For example, the individual modules of a disk array typically take up very little space and typically use less power and cost less than a single large disk drive, yet, when grouped together in an array, provide the same data storage capacity as a single large disk drive. In addition, the small disks of an array retrieve data more quickly than does a single large disk drive because, with a small disk drive, there is less distance for the actuator to travel and less data per individual disk to search through. The greatest advantage to small disk drives, however, is the boost they give to I/O performance when configured as a disk array subsystem.

A disk array is typically housed in a chassis, which may be an enclosure, for holding a plurality of disk drives. When additional memory storage space is required, it is desirable to be able to add an additional disk array chassis to the existing system. It is further desirable that one be able to add the new disk array chassis to the existing system without needing to shut down the existing system. In other words, it is desirable to provide a dynamically upgradeable disk array system.

For a system including a disk controller communicating over a loop with a plurality of disks, it is undesirable to expand that bus by simply adding more disk drives. There may be a malfunction in any of the new disk drives. Further there may be a problem with the new connection to the existing loop. While the functional status of the new equipment can be tested by the disk controller after it is connected to the loop, if there is a malfunction, the entire loop (and disk drives) will be degraded and may be rendered inoperable or inaccessible. Therefore, it is desirable to be able to determine the integrity of the new disk drives and bus before permitting interface with the existing system.

SUMMARY OF THE INVENTION

In accordance with an embodiment of the present invention, a dynamically upgradeable disk array chassis includes a chassis that contains the disk drives. The disk drives and a disk controller are connected in a loop with a first serial bus for transmitting data from the controller and a second serial bus for passing data back to the controller. The disk drives are connected to one or the other of the serial busses. A shunt is connected to the first and second busses at the end opposite the controller and has a normal state in which the first bus is connected to the second bus thus completing the loop. The shunt may also assume a state in which each of the first and second serial busses are connected to separate outputs. The separate outputs are used to connect to a new disk array chassis with similar busses and shunting device. Each chassis has an environmental monitor that controls the state of its shunt. A separate serial communication bus connects to the monitor. When a new disk array chassis is connected to the existing chassis, the existing chassis's environmental monitor may communicate through its serial communication bus with the serial communication bus and environmental monitor on the new disk array chassis to determine whether conditions are suitable for extending the disk drive loop to include the disks on the new disk array chassis. It no faults are detected, the existing chassis's environmental monitor switches its shunt to connect the disk drive serial busses of the existing disk array chassis to those of the new disk array chassis. The new chassis's environmental monitor leaves its shunt in the normal state to connect the two disk drive busses and the disk drive loop is again complete.

In accordance with an embodiment of the invention, diplexing is used to provide the path for the serial communication bus to the environmental monitor, and the signals for the disk drive loop over the same wires of a single cable connecting the disk array chassis to one another. Preferably, low frequency signals are used for the communication with the environmental monitor and high frequency signals are used for disk drive loop communications including I/O operations. The low frequency signals may be similar to those of the RS-232 serial data protocol and the high frequency signals may adopt the Fibre Channel Arbitrated Loop signal protocol. The Fibre Channel 8B/10B signal encoding advantageously guarantees frequent transitions on the Fibre Channel signal so that the signal can always be distinguished from the low frequency signals. The Fibre Channel encoding keeps the frequency content of the Fibre Channel signal isolated to 100 MHZ and above by guaranteeing a transition at least every 5 bits.

A diplexer is connected to the environmental monitor serial communication bus and the separate disk drive serial bus outputs of the shunt for combining the high frequency data signals from the disk drive controller and the low frequency data signals from the environmental monitor serial communication bus which are to be sent out from the chassis. The diplexer also includes a configuration for separating the high frequency disk drive serial bus data signals from the low frequency environmental monitor SC8 data signals coming in from the new disk array chassis. By providing a single connector and diplexing and shunt control in the presently preferred embodiment for both the low and high frequency communication signals, the integrity of the new chassis may be determined over the low frequency environmental monitor communication path without electrically connecting the high frequency path and possibly disrupting operation on the existing disk array system. Only after the integrity of the connection and the operability of the new disk array enclosure is determined will the existing chassis shunt be switched into the state permitting connection of the high frequency data path with the disk drives of the new disk array chassis.

Referring now more particularly to the multiplexing of the two signals, it is noted that a common Fibre Channel (FC) data communications link may be used. In preferred embodiments of the invention, the first signal to be diplexed is a low frequency asynchronous or synchronous RS-232 type serial signal, and the second signal is the standard high frequency Fibre Channel signal. The terms "low frequency" and "high frequency" are used herein as relative to one another. As used herein, a low frequency signal is one that can be separated by filtering from the high frequency signal and vice versa. The low frequency signal, which in preferred embodiments is used to communicate between environmental monitor UARTS, is extremely slow in comparison to the Fibre Channel signal. This signal, preferably transmitted at 9600 baud, has a maximum fundamental frequency of 4.8 kHz, and a minimum frequency of DC. The square wave nature of this signal will normally have higher order harmonics which extend to very high frequencies. Consequently, in preferred embodiments of the invention, these harmonics may be limited by low pass filtering without affecting the information content of the signal, with the intended result of isolating the RS-232 type signal to a low frequency band from DC to about 100 kHz. The high frequency FC signal is limited to 100 MHZ. and beyond by the aforementioned 8B/10B encoding.

In an embodiment of the present invention, the high frequency Fibre Channel, and the low frequency RS-232 type signal, are frequency division multiplexed into a composite signal which is sent over a single cable. The cable will preferably be a twinax Fibre Channel arbitrated loop standard configuration having two conductor pairs (1 pair for each direction) contained within a common shield. Isolation between the two conductor pairs is maintained by locating the two pairs orthogonally in the cable. Each pair will contain a FC signal in differential mode, and a RS-232 signal in common mode. In each conductor pair, one wire conducts a sum of the high frequency FC signal and the low frequency RS-232 type signal and the other wire conducts the difference resulting when the high frequency FC signal is subtracted from the low frequency RS-232 type signal.

BRIEF DESCRIPTION OF THE DRAWINGS

The invention may be more readily understood by reference to the following detailed description, taken with the accompanying drawings, in which.

DETAILED DESCRIPTION OF THE PREFERRED EMBODIMENTS

Figure 1:
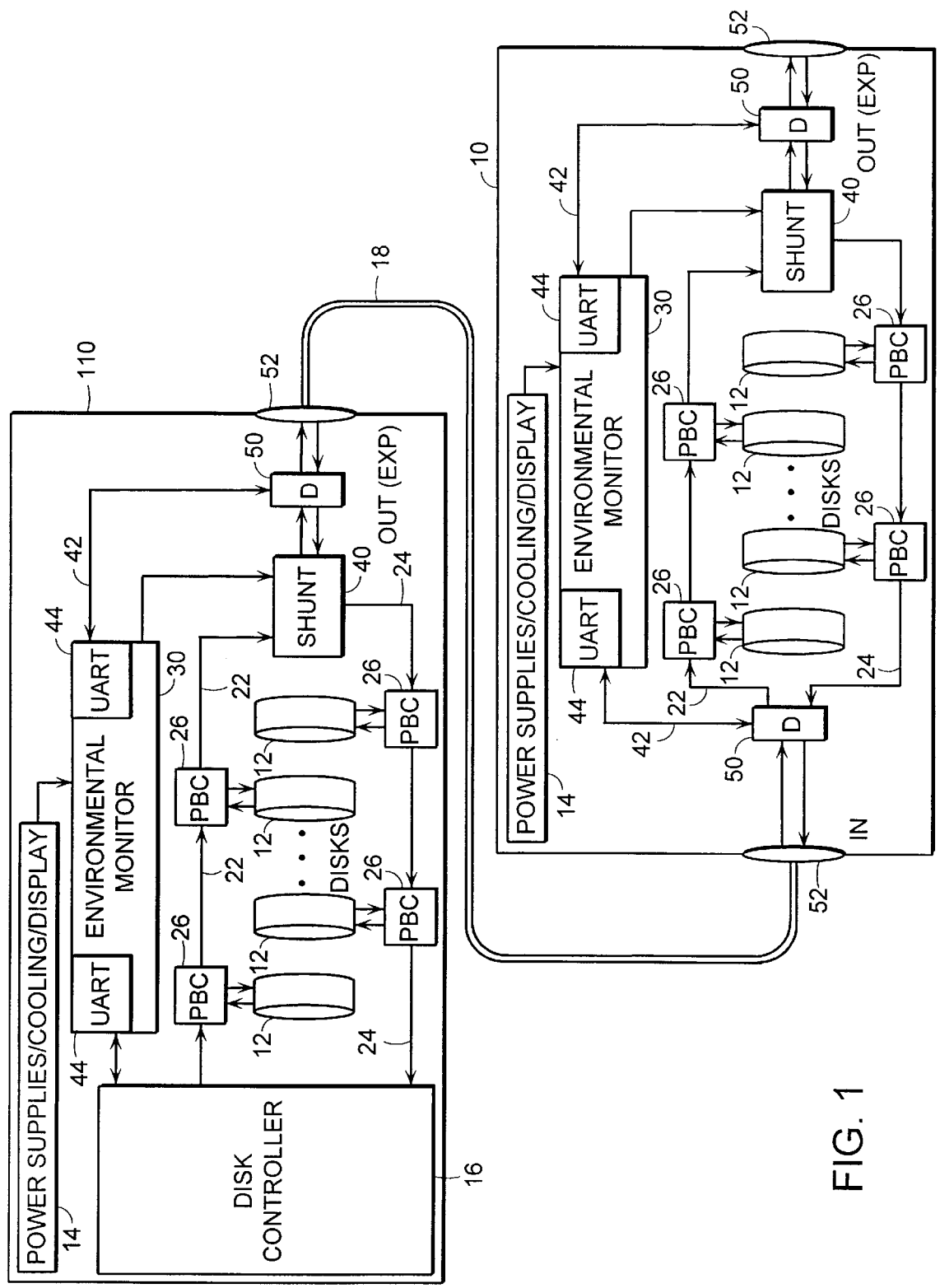
FIG. 1 is a block diagram of a chain of dynamically upgradeable disk array chassis of the present invention.

Referring now to the drawings, a disk array chassis 10 is shown in block diagram form in FIG. 1. The disk array chassis provides a series of openings into which disk drives 12 may be inserted. The chassis 10 of FIG. 1 is shown capable of housing a specified number of disk drives 12, for example ten. The mechanical chassis may be an open or closed housing or enclosure. Inside the chassis are conventional auxiliary equipment 14 including cooling fans, power supplies and a display card. The display card controls a display on the outside of the housing which may be used to exhibit certain status conditions. Status conditions are determined by the environmental monitor.

The disk drives are interconnected by a high speed serial data communication path. In accordance with the presently preferred embodiment, the communication path is a loop including a first serial bus 22 directing data in one direction and a second serial bus 24 directing data in a second opposite direction. The preferred data loop is a Fibre Channel arbitrated loop. A series of port bypass circuits 26 are inserted along the loop for making the connection with the disk drives 12. Each port bypass circuit 26 is controlled by an environmental monitor 30. The control line between the environmental monitor 30 and the port bypass circuit 26 exists, but is not shown in FIG. 1. When the port bypass circuit is in its bypassed condition, its associated disk drive is shunted out of the loop. The environmental monitor 30 switches the port bypass circuit 26 into a non-bypassed condition so that signals on the serial bus are directed to and from the associated disk drive. In order to provide a high availability system, the disk array chassis of the presently preferred embodiment may include two high speed data communication loops and environmental monitors acting redundantly. Each loop is connected ultimately to a disk controller 16. The two disk control processors 16, one for each loop, further serve to provide high availability of the data storage system.

It is desirable that the disk array chassis permit dynamic upgrading. In that regard, a shunt 40 is provided along the Fibre Channel loop. In the presently preferred embodiment, the shunt 40 may be a port bypass circuit. The first serial bus 22 providing data in a first direction is connected to the shunt and the second serial bus 24 providing data in the opposite direction is also connected to the shunt. When the shunt is in its normally bypassed condition, the Fibre Channel loop ends at the shunt and data passes directly from the first serial bus 22 through the shunt to the second serial bus 24. When the shunt is switched into a non-bypassed state, the first bus 22 is allowed to pass to an expansion connection 52 and the second bus is connected to an incoming signal from the expansion connection. This extends the Fibre Channel loop into the next chassis.

The shunt is controlled by the environmental monitor 30. The environmental monitor 30 is provided with a serial communication path 42 that can lead to an adjacent disk array chassis. The environmental monitor is a supplier of status signals and other environmental information. The monitor may be any entity that sequences the status signals onto the serial communication path 42. The environmental monitors of the presently preferred embodiment are provided with two universal asynchronous receiver transmitters 44 (UART) for communicating with a chassis connected at either end of the chassis housing the monitor. While the communication path 42 may be provided for connection to an adjoining disk array chassis separate from the Fibre Channel loop, in accordance with the presently preferred embodiment of the invention, the communication path 42 is provided as a path for low frequency signals which are diplexed with the high frequency Fibre Channel signals for transmission over a single cable 18. Preferably a twinax cable 18 is used. This is a standard cable for Fibre Channel. The present invention advantageously adds a low frequency signal to the high frequency Fibre Channel signals normally carried by the cable. A twinax cable 18 includes four wire conductors, each divided into two pairs. Each pair transports signals in a single direction so one pair is used for the exiting signals and the other pair of wires in the twinax cable 18 is used for the returning signals.

A diplexer 50 is preferably connected to transmit and receive the low frequency signals from the environmental monitor 30 and also to transmit and receive high frequency signals from the shunt 40. The other end of the diplexer is connected to a cable connector 52. Regardless of the state of the shunt, communications between disk array chassis environmental monitors are possible over the single twinax cable 18. The disk array chassis includes a diplexer on both ends of the high frequency drive serial busses, except for the first chassis 110 that houses the disk controller 16 where only one diplexer is required. Communications can thus be maintained with the preceding and subsequent disk array chassis. The environmental monitor communicates with low frequency signals that can be separated from the high frequency Fibre Channel signals by filtering in the diplexer. The signals from the diplexed cables can be split with one copy of the signals being high pass filtered while the other copy of the signals is low pass filtered to extract each of the two separate signals. A preferred method of diplexing, however, will be described later herein.

A data storage system is configured by providing 1 or more disk control processors 16, each in communication with one of the Fibre Channel loops and in low frequency communication with the environmental monitors. Disk array chassis are connected to the processors in a continuous chain. The arrangement of the high frequency communication path with two serial busses through each disk array chassis providing communications in each direction permits a high frequency loop. The shunt in each disk array chassis is in the non-bypassed position except for the final active disk array chassis in the chain which remains in the normal bypass condition closing the loop. The disk control processors 16 may be provided in a first chassis 110 along with a disk array. This first chassis 110 in the chain only requires a single diplexer since there is no connection to a preceding chassis.

Dynamically upgrading a data storage system of the invention shall now be described. An existing chain of disk storage chassis is provided. The system may include a single chassis enclosing a disk array with the disk controller. Alternatively, the system may include additional disk array chassis connected in a chain to the controller chassis. The system is upgraded by connecting an additional disk array chassis to the last disk array chassis in the existing chain. A communication cable 18 is connected from the new disk array chassis to the expansion connector 52 on the chassis of the last disk array chassis in the existing chain. This last disk array chassis in the chain has a shunt 40 which is in the normally bypassed condition connecting its first serial bus 22 to the second serial bus 24 and completing the Fibre Channel loop. When the cable 18 is inserted into the connector, the shunt remains in the bypassed condition. The new disk array chassis is now in communication via the low frequency signals conducted over the low frequency serial communication path with the environmental monitor 30. After the connection has been made, the environmental monitor 30 in the existing system can communicate with the environmental monitor 30 in the new disk array chassis. If it is determined that the new disk array chassis is properly connected and operating properly, the shunt 40 is switched into the non-bypassed state extending the high frequency communications loop onto the new chassis.

Figure 2:
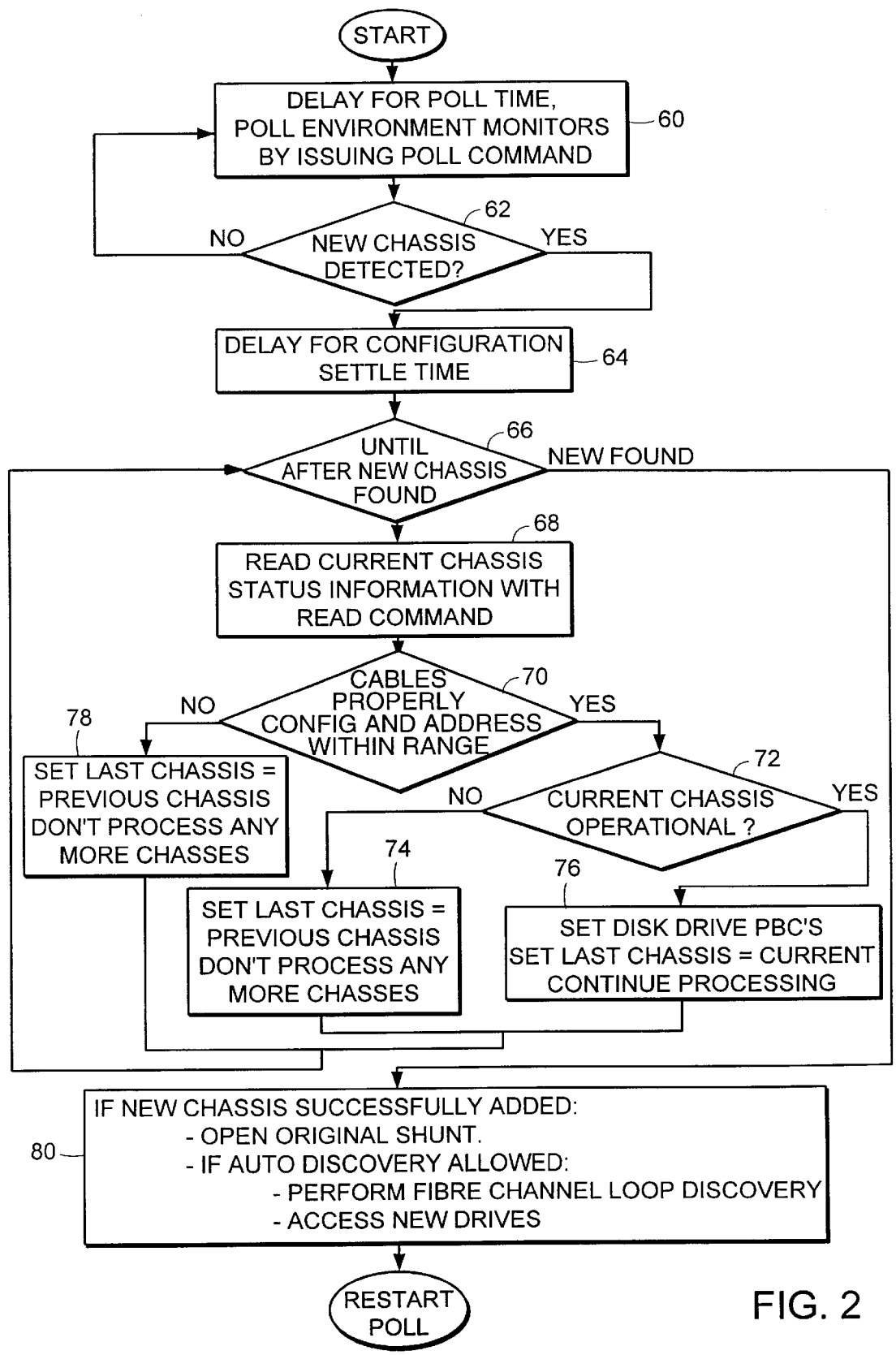
FIG. 2 is a flow chart of an upgrading algorithm for use with the present invention.

Referring now to FIG. 2, a flow chart of the communications conducted along the low frequency environmental monitor serial communication path, shall now he described. In accordance with the presently preferred embodiment, the commands supported by the serial protocol along the communication path include a poll, read and write command. These commands are issued by the disk controller 16. The poll command returns the address of each chassis and an indication if that enclosure has changed state since the last poll was issued. The address of a chassis is known to the environmental monitor 30. At present, it is preferred that the address be set by manual switches on the outside of the chassis. In this manner, a chassis can be given a distinct address different from each of the other chassis that have already been connected to the existing system. Preferably, the user will address the chassis in a numerical order such as 1, 2, 3, 4 . . . A read command is directed to a specific chassis address and returns detailed environmental status about the chassis including its power, cooling and disk drive status. A write command is used by the disk controller to control the operation of the chassis. This command allows the disk controller to turn on or off any port bypass circuit and the shunt 40 of any chassis.

With the shunt of the penultimate chassis still in the bypass condition, the disk controller is able to monitor and control the newly added last chassis via the diplexed serial communication path 42 without disrupting the ongoing activity on the Fibre Channel loop. This allows the disk controller to verify the configuration and environmental status of the new chassis before enabling the new drives onto the Fibre Channel loop. As set forth in FIG. 2, the disk controller runs a periodic polling 60 of all the environmental monitors on the system over the low frequency serial communication path 42. The poll command goes out from the disk controller and is received by all of the environmental monitors that are connected to the low frequency serial communication path. Each environmental monitor 30 on the path returns its address and an indication of whether there has been any state change since the last poll. If a new chassis is detected 62 during this periodic polling process, a dynamic upgrading algorithm is initiated. A time delay 64 is imposed to allow for the configuration of the system to settle as the new chassis is powered up.

After completion of the time delay, the disk controller reads the status 68 from every environmental monitor 30 along the low frequency serial communication path 42. The read command produces from each environmental monitor information about the cabling and address of the chassis 70. This is used to verify that the cabling is properly configured. The address is checked to be sure it is within the range of legally assignable addresses. The read will also return information as to whether the current chassis is operational 72, i.e., powered and functioning properly. If a problem is found with respect to any of the environmental monitors, the Fibre Channel loop will be terminated at the previous chassis 74, 78 so that only operational chassis are permitted on the Fibre Channel loop. If the chassis is properly connected and operational, processing continues 76 until the new chassis is found 66. If the new enclosure is properly connected and is operational, then it will be set as the last enclosure in the system 76. The shunt 40 of the previous chassis will be switched into a switched state 80 to permit Fibre Channel communications with the disks on the new chassis. The Fibre Channel loop may then be instructed to either automatically if it is so set or upon manual indication perform a discovery process to reinitialize the operation on the Fibre Channel loop to include the new disks. This discovery process on the Fibre Channel loop is disruptive to any Fibre Channel activity and may take several seconds to complete. Therefore, it is preferred that the system provide the system administrator with the option of automatically entering discovery or selecting a manual process that is initiated by a directive from the host system. The discovery process makes the disk drives known to the disk controller's Fibre Channel driver and allows the upper layer protocol drivers (SCSI) to communicate with the disks.

Figure 3:
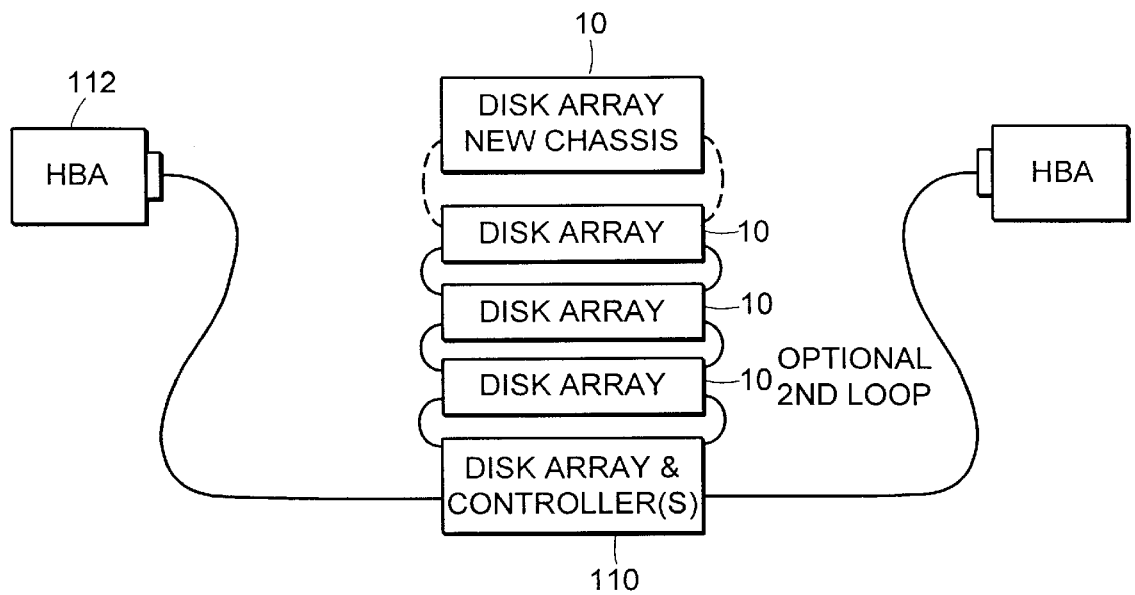
FIG. 3 is a block diagram of a system of interconnected disk array chassis.

Advantageously, communications with the new disk array chassis along the high frequency Fibre Channel do not begin until the disk controller has had an opportunity to communicate with the new disk array chassis through the low frequency communication path. This process operates separately and independently through each of the two cables in a redundant system such as that shown in FIG. 3. Thus, a new disk array chassis in the redundant system embodiment is added by connecting two cables to the existing chain, one for each loop. The connection of each cable operates separately to enable communications over the respective Fibre Channel loop. FIG. 3 illustrates a chain of disk array chassis. At the bottom of the chain, the chassis 110 houses a pair of disk controllers as well as a disk array. Each disk controller is in connection with one of the Fibre Channel loops. The chassis with the disk controller is used for connection to one or more host bus adaptors 112. A host bus adaptor links a host computer with the memory storage provided by the disk arrays. Each of the disk array chassis 10 in the chain is shown with one of two cables connecting each of its redundant loops to the adjoining disk array chassis.

Figure 4:
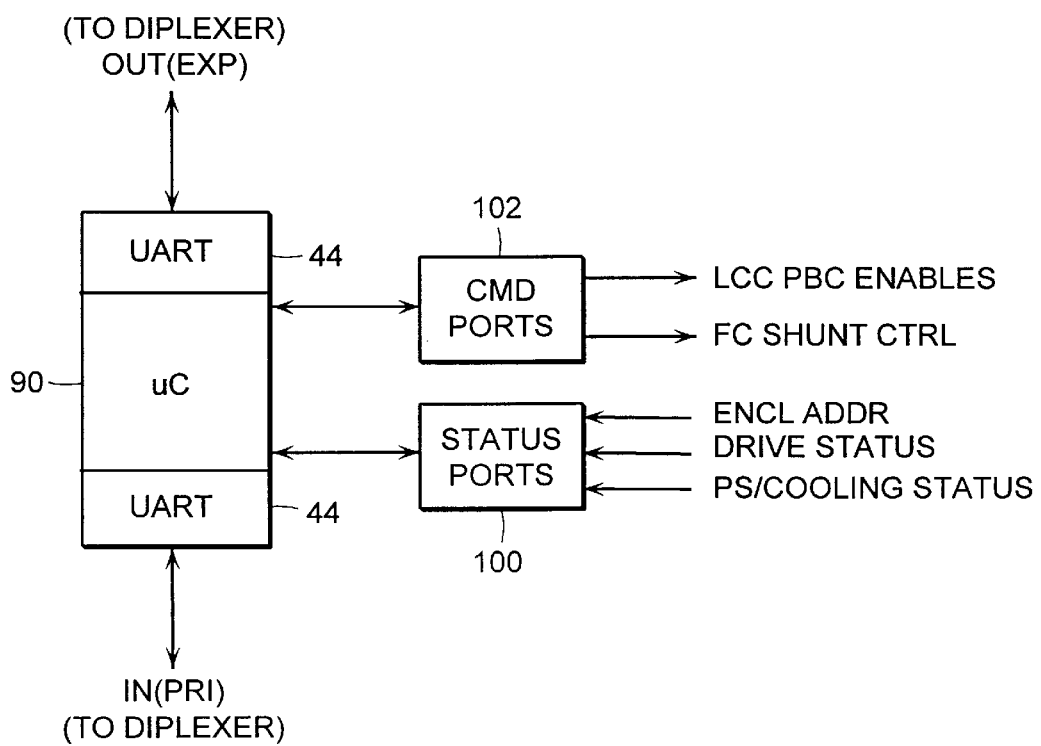
FIG. 4 is a block diagram of an environmental monitor for use in the disk array chassis of FIG. 1.

A presently preferred environmental monitor 30 for use in the invention is shown in greater detail in the block diagram of FIG. 4. The monitor program is run on a microcomputer 90. The microcomputer is shown connected to the dual UART's 44. One UART is connected to the input end of the chassis, the other is connected to the expansion end. The UART receives and transmits signals on the low frequency serial communication path 42.

The environmental monitor 30 also includes a number of status ports 100 for monitoring various conditions within the enclosure. One of the status signals is the chassis address (Encl Addr). According to the present embodiment, the address of the chassis is manually set by switches on the outside of the chassis. Thus, a chassis can be manually set to have an address different from the already present disk array chassis in the existing chain of chassis. Other status signals include power system status, cooling status and drive status. The environmental monitor also includes port bypass circuit control latches 102. These control the port bypass circuits 26 for each of the disk drives that may be inserted into the disk array enclosure. Also one of the latches will control the shunt 40.

Figure 5:
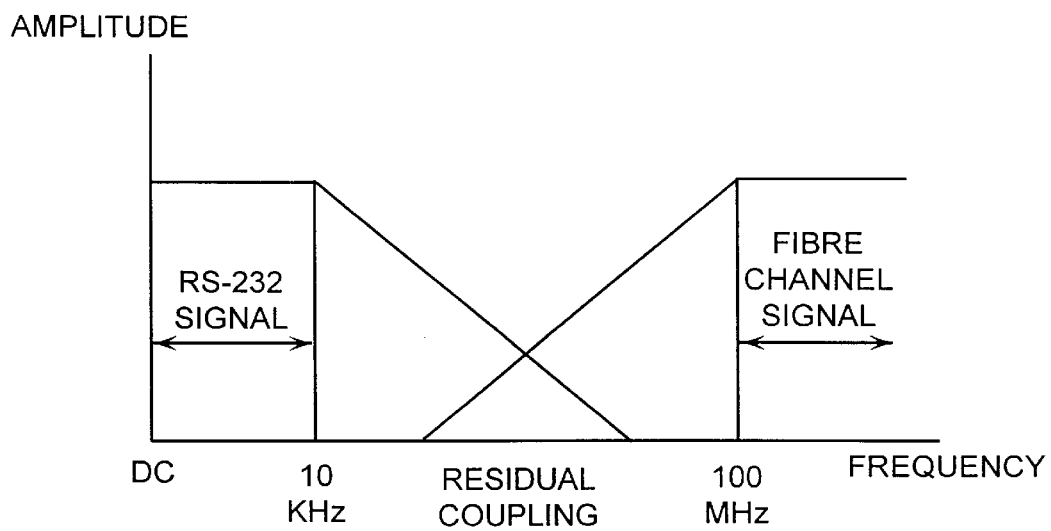
FIG. 5 is a graph showing the diplex filter frequency response.
Figure 6:
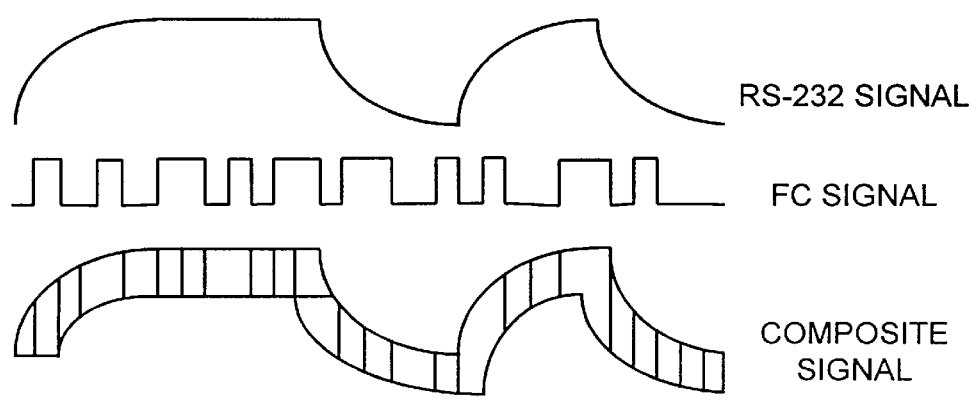
FIG. 6 is a figure showing the composite Fibre Channel and RS-232 type signals.

In preferred embodiments of the invention, low frequency signals and high frequency signals are frequency division multiplexed into a composite signal for transmission on cables between chassis. They may be simply combined and separated by a diplex filter at each end of the cable, hence use of the term "diplexing." FIG. 5 shows the diplex filter frequency response. FIG. 6 shows a RS-232 type signal, a FC signal, and the diplexed composite of the two. The diplex filter has three ports, the cable port, a low pass port and a high pass port. The filter is constructed by connecting the output of a high pass network and a low pass network together. The high pass network will preferably act as an open circuit at low frequency; the simplest form of this high pass network is a capacitor. The low pass network will preferably look like an open circuit to the high frequency Fibre Channel signal; the simplest form of the low pass network is an inductor or a resistor. The resistor may be used if the system can tolerate the DC resistance; alternatively, inductors may be used without loss of effectiveness, but they are not ideal devices since achieving broad bandwidth isolation with an inductor is more difficult than with resistors.

Diplexing may be used for communication between a variety of types of computer components. The connection between these components will preferably be with a pair of twinax cables carrying the two Fibre Channel loops. There is also an RS-232 type communications channel between environmental monitors. In embodiments of the invention, the use of twinax affords two options for coupling the RS-232 type low frequency signal onto the cables. In one embodiment of the invention, the signal may be applied as a differential signal on the twinax cable; in a preferred embodiment of the invention, the signal may be applied as a common mode signal to both sides of the twinax.

Figure 7:
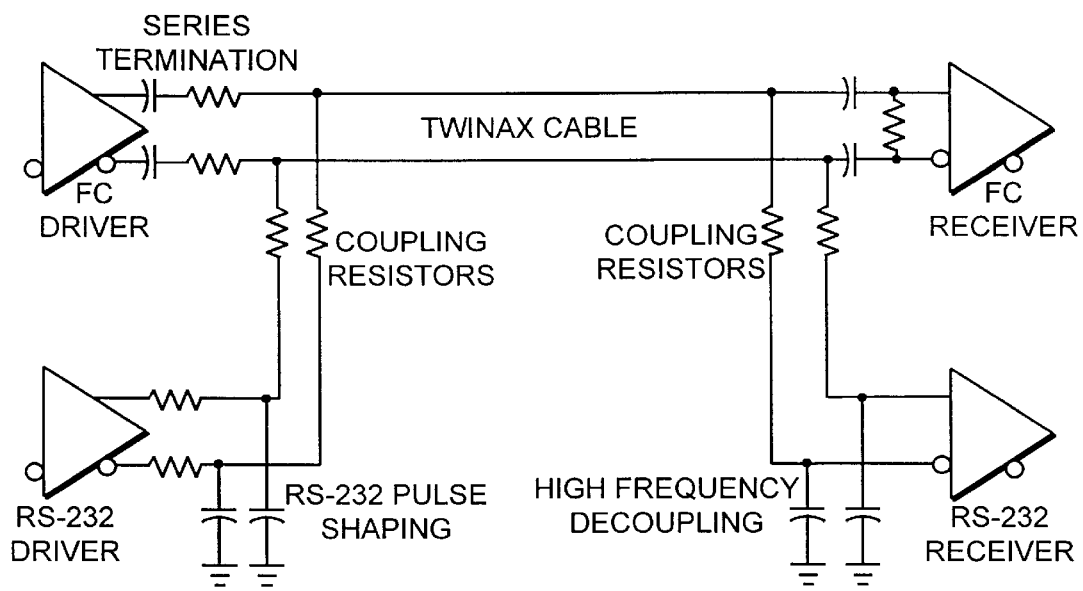
FIG. 7 is a circuit diagram for the differential coupling circuit.

A circuit for the first method, differential coupling, is shown in FIG. 7. Coupling the RS-232 type low frequency signal differentially onto the twinax is one possible way to pass the signal from chassis to chassis. This is the same coupling method as that used for the Fibre Channel signals. This method has the highest level of noise immunity for the low frequency signals. Noise sources such as ground noise and low frequency magnetic fields can be easily rejected using this technique. On the down side, this coupling method will not work if equalized cable assemblies are used (that's not to say that equalization cannot be done). Another detractor is that any residual coupling of the RS-232 type low frequency signal into the FC signal will be a differential noise source and cause some amount of jitter.

Regarding ground noise, the chassis to chassis twinax-interconnects will preferably be in the range of 0 to 10 meters in length. These connections will be between chassis within a rack, or between racks in close proximity. There may be a ground voltage potential between two systems in different racks. This ground noise is superimposed on the cable as a common mode signal. The differential receiver will reject the common mode noise, and properly receive the differential signal.

Regarding magnetic susceptibility, in an embodiment of the invention, the twinax cable will preferably be shielded and, in the preferred embodiment of the invention, the shield is connected to chassis ground at both ends. Although this configuration is not the optimal configuration for magnetic shielding, this is required for good high frequency emissions performance. If the cable is brought into an AC magnetic field, a current will be induced to flow through the cable shield, around the ground loop. This current will couple a noise voltage into the internal signals through the mutual inductance between the shield and signal conductors. This noise voltage will be coupled in as a common mode noise source in this configuration, and be rejected by the receiver.

Regarding coupling noise, in an embodiment of the invention, the Fibre Channel signal is very low amplitude relative to the RS-232 type low frequency signal. With the use of a simple R/C pulse shaping filter, and simple capacitive/resistive diplex filter, there is some residual RS-232 signal coupled into the Fibre Channel receiver as shown in FIG. 5. This noise is minimized by making the slew rate of the RS-232 type low frequency signal as slow as possible for the required data rate. The residual noise coupled into the FC receiver is differential noise in this instance, and results in some additive jitter on the received FC signal. This noise is manageable for data rates of 9600 baud and below, while better lowpass filtering may be required for higher data rates.

Regarding external compatibility, in an embodiment of the invention, the rejection of the low frequency signal in the Fibre Channel receiver is accomplished by the AC coupling circuit at the receiver front end. This coupling circuit uses 1000 pF capacitor and 150 ohm termination resistance. If a cable carrying a diplexed signal is plugged into another vendor's equipment, the residual signal coupling, described further below, may be quite severe. The critical factor is the value of the coupling capacitance, as larger values increase the unwanted signal coupling. As there is no standard for this circuit, a preferred embodiment will allow for blocking the diplex signal when connecting to an external host device that cannot safely support the present invention. Preferably, a media converter will be designed to overcome such connection problems. Note, however, that this only applies to JBOD configurations ("just a bunch of disks," i.e. no controller for the disks within the JBOD unit) with DB-9 twinax cables.

Regarding equalizer compatibility, in an embodiment of the invention, the low frequency signal is coupled onto the twinax cable with 1 k ohm resistors instead of inductors. This places a high DC resistance in series with the RS-232 type low frequency driver. An equalizer, which would be used for a long twinax cable, will have a fairly low impedance between the differential signals. There will be a voltage divider effect between the equalizer impedance and the coupling resistors which will severely attenuate the low frequency signal. This will be a problem if an equalized cable assembly is used. A preferred solution to this issue is to use equalizers for the DB-9 twinax cable, and tapping off the low frequency signal before the equalizer. This would allow the DB-9 to DB-9 media converter to contain an equalizer if we want to support twinax links over 10 meters long. Preferred embodiments will not operate with twinax cables which have an equalizer in the cable connector housing.

Regarding crosstalk, in an embodiment of the invention, the invention will utilize twinax having four conductors contained within a common shield (hereinafter twinax4), wherein isolation between the two conductor pairs is maintained by locating the two pairs orthogonally in the cable. This insures symmetrical coupling from the + and − differential signals, and the net differential crosstalk between pairs is 0. One pair carries the outgoing signals and the other pair carries the returning signals. For differential coupling of the RS-232 type low frequency signal, there will not be any substantial crosstalk coupling from one pair to the other.

Figure 8:
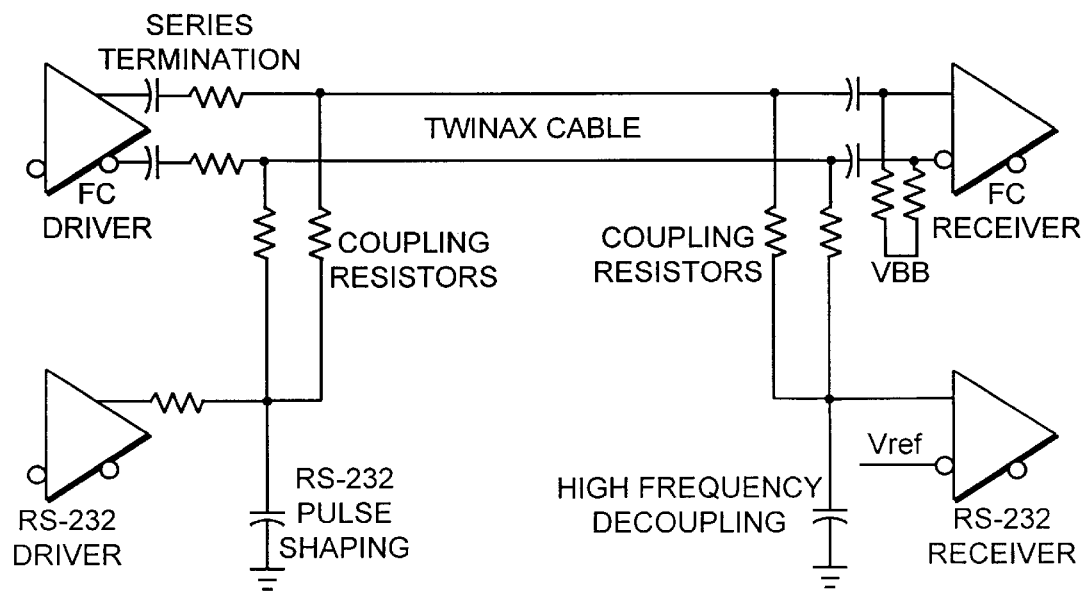
FIG. 8 is a circuit diagram showing the common mode coupling circuit.

A circuit for the second method, common mode coupling, is shown in FIG. 8. Preferred embodiments of the invention utilize the fact that the Fibre Channel receiver has common mode rejection to reduce noise coupling from the low frequency signals. Consequently, since the two signaling approaches on the cable are orthogonal, allowing each receiver to reject the signal from the other. The high frequency signal will preferably be driven differentially on the twinax pair, and the low frequency signal will preferably be driven on both signal conductors with the cable shield serving as the signal return path. The advantages of this method are that it allows potentially higher signaling rates, is compatible with equalized cable assemblies, and is potentially more compatible with host interfaces. The noise rejection and crosstalk performance are worse however.

Regarding ground noise issues, in an embodiment of the invention, any ground potential difference between the transmitter and receiver ends of the cables will couple directly into the common mode low frequency signal as noise. While this is not a new problem for RS-232 type links, it is often overcome by running very large signal swings. A preferred embodiment of the invention would be to keep the swing at 5 V peak to peak, or less, which may not be as immune to this noise as traditional links.

Regarding magnetic susceptibility, in an embodiment of the invention, by running the low frequency signal as a common mode signal, the twinax is being used essentially as a coaxial cable. This type of cable configuration allows the shield current induced by an AC magnetic field to impose a noise voltage onto the low frequency signal. This voltage will detract from the signal's noise margin.

Regarding coupling noise, in an embodiment of the invention, coupling of the RS-232 type low frequency signal into the Fibre Channel receiver is now less of a problem because the residual signal coupling is being applied as a common mode noise source. The receiver has very good rejection to low frequency common mode noise, so the noise does not create any jitter on the Fibre Channel signal. This allows the low frequency signal pulse filtering to be relaxed, and higher data rates can be accommodated.

The Fibre Channel receiver has a limited common mode rejection range, so the common mode signal must be attenuated before it reaches the receiver. This attenuation is achieved by a voltage divider effect between the Fibre Channel coupling capacitors, and the 150 ohm termination impedance. Preferred embodiments will have termination mode up of two 75 ohm resistors to VBB or some other DC source to provide a common mode termination.

Regarding external compatibility, in an embodiment of the invention, the attenuation of the common mode low frequency signal in the Fibre Channel receiver is accomplished by the AC coupling circuit and termination at the receiver front end. The value of the coupling capacitor is less critical in this configuration, as any additional noise will be rejected. The critical factor for interoperability is that the termination be common mode. As there is no standard for this circuit, a preferred embodiment will allow for blocking the diplex signal when connecting to an external host device that cannot safely support the present invention. Preferably, a media converter will be designed to overcome such connection problems. Note, however, that this only applies to JBOD configurations with DB-9 twinax cables.

Regarding equalizer compatibility, in an embodiment of the invention, the common mode transmission of the low frequency signal is fully compatible with equalized cable assemblies. The equalizer will act as a low impedance in series with the signal path which will have a minimal effect.

Regarding crosstalk, the common mode low frequency signal does have a crosstalk issue on the twinax4. The cable has capacitive coupling between the two signal pairs which induces a noise voltage on the other low frequency signal in the cable. This coupling is dependent on risetime, and is sensitive to cable length. In preferred embodiments of the invention, overall the crosstalk will only be a few percent, and will not significantly degrade the noise margin of the signal.

Figure 9:
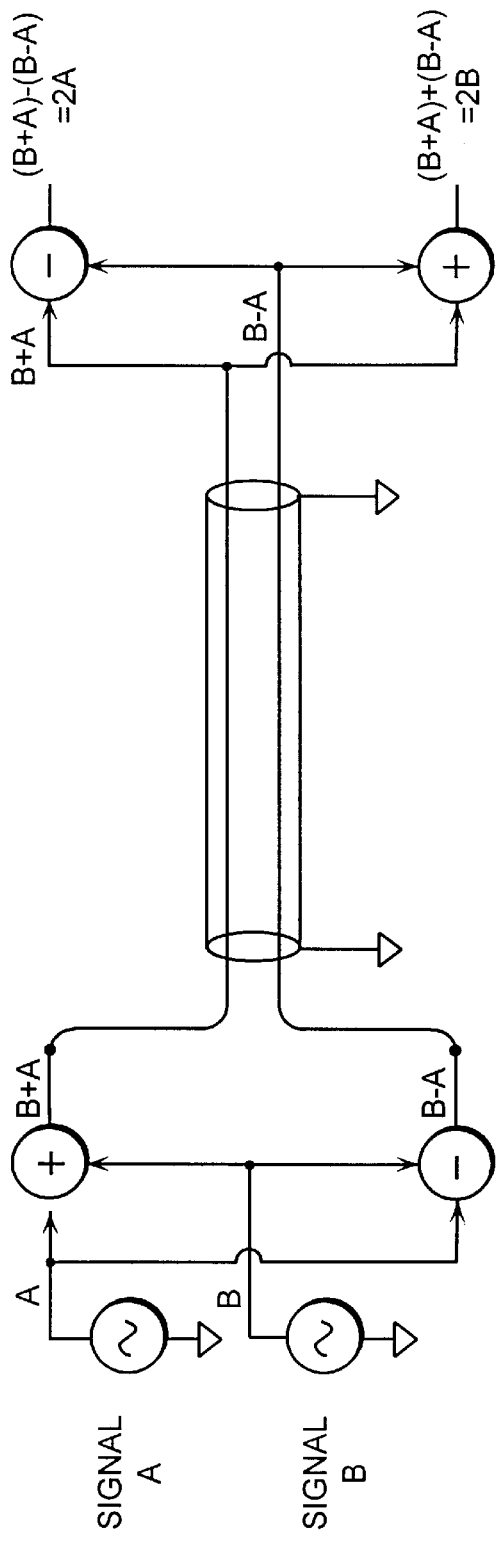
FIG. 9 is a functional diagram showing an embodiment of the invention using twin-ax or twisted-pair cable and common mode coupling.

FIG. 9 is a simplified diagram of an embodiment of the diplexing of the invention, wherein first and second signals are transmitted on a communication link, and wherein the communication link is preferably twin-ax or twisted pair cable having a transmission-end and a receiving-end. The communication link has a pair of conductors including a first conductive path and a second conductive path. The first signal to be transmitted is designated as signal (A), and the second signal is designated as signal (B). Signal (A) is sent as a differential mode signal. Signal (B) is sent as a common mode signal. The first conductive path contains the addition of signals (A)+(B). The second conductive path contains the subtraction of (B)−(A). At the receiving-end, the first and second conductive paths are both sent separately to an adder and a subtractor. At the subtractor, the second conductive path's signal (B)−(A) is subtracted from the first conductive path's signal (B)+(A), resulting in the (A) signal. At the adder, the second conductive path's signal (B)−(A) is added to the first conductive path's signal (B)+(A), resulting in the (B) signal. A useful consequence of this embodiment of the invention is that in the subtractor, common mode line noise is efficiently eliminated, and in the adder, differential mode line noise is also eliminated.

Figure 10:
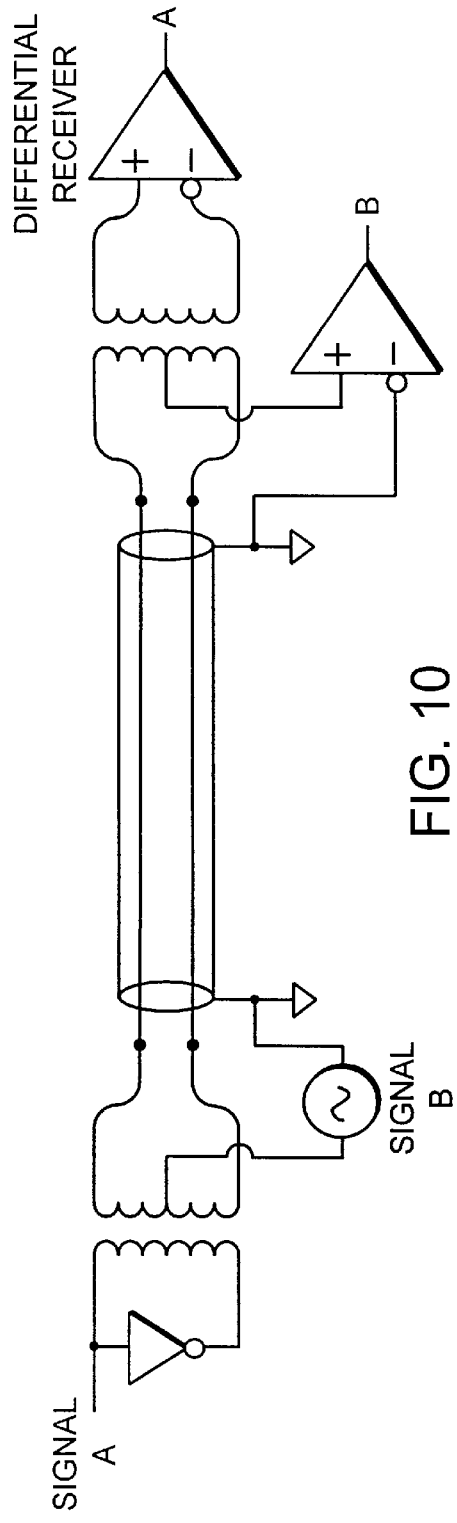
FIG. 10 shows an implementation of the FIG. 9 circuit diagram implemented using transformers.

FIG. 10 is a particular implementation of the FIG. 9 embodiment, using transformers.

Figure 11A:
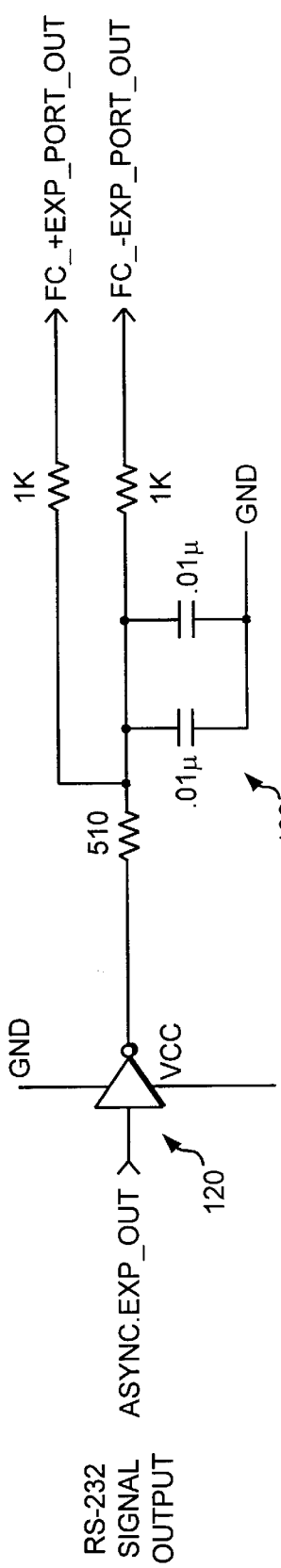
FIGS. 11A and 11B are schematic circuit diagrams of the low frequency signal output and input portions, respectively, of a diplexer for use in the disk array chassis of FIG. 1.
Figure 11B:
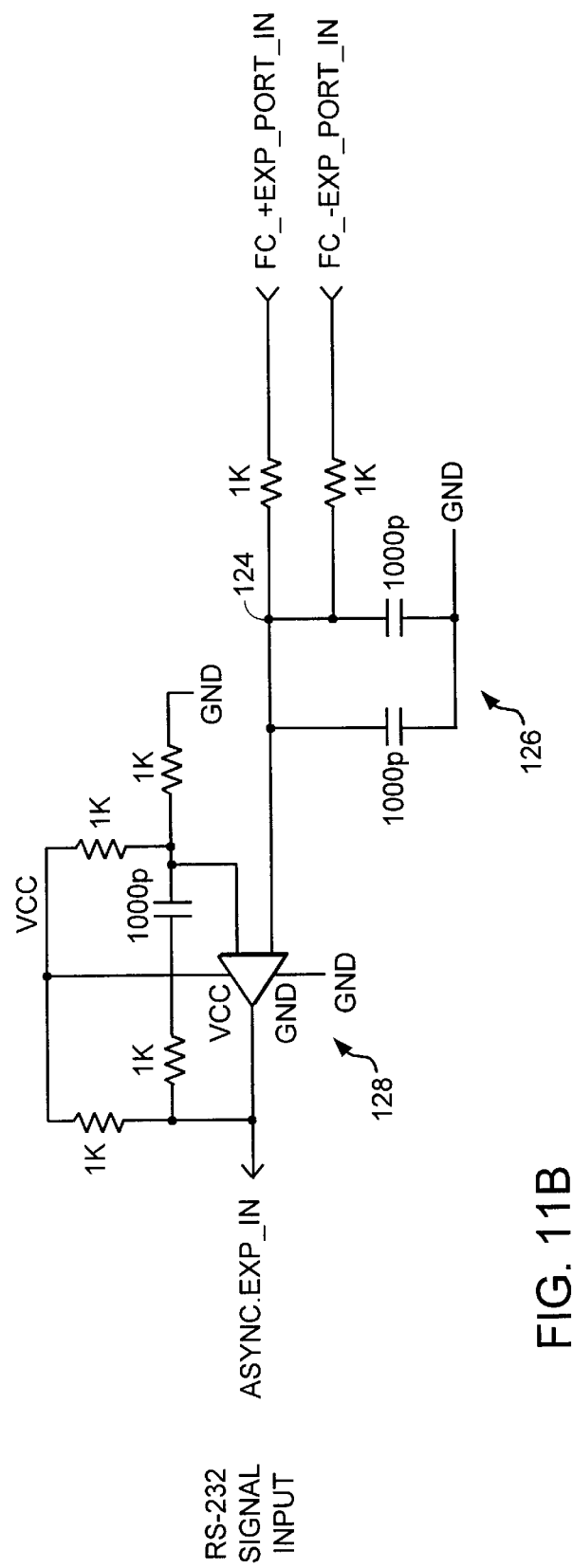
Figure 12:
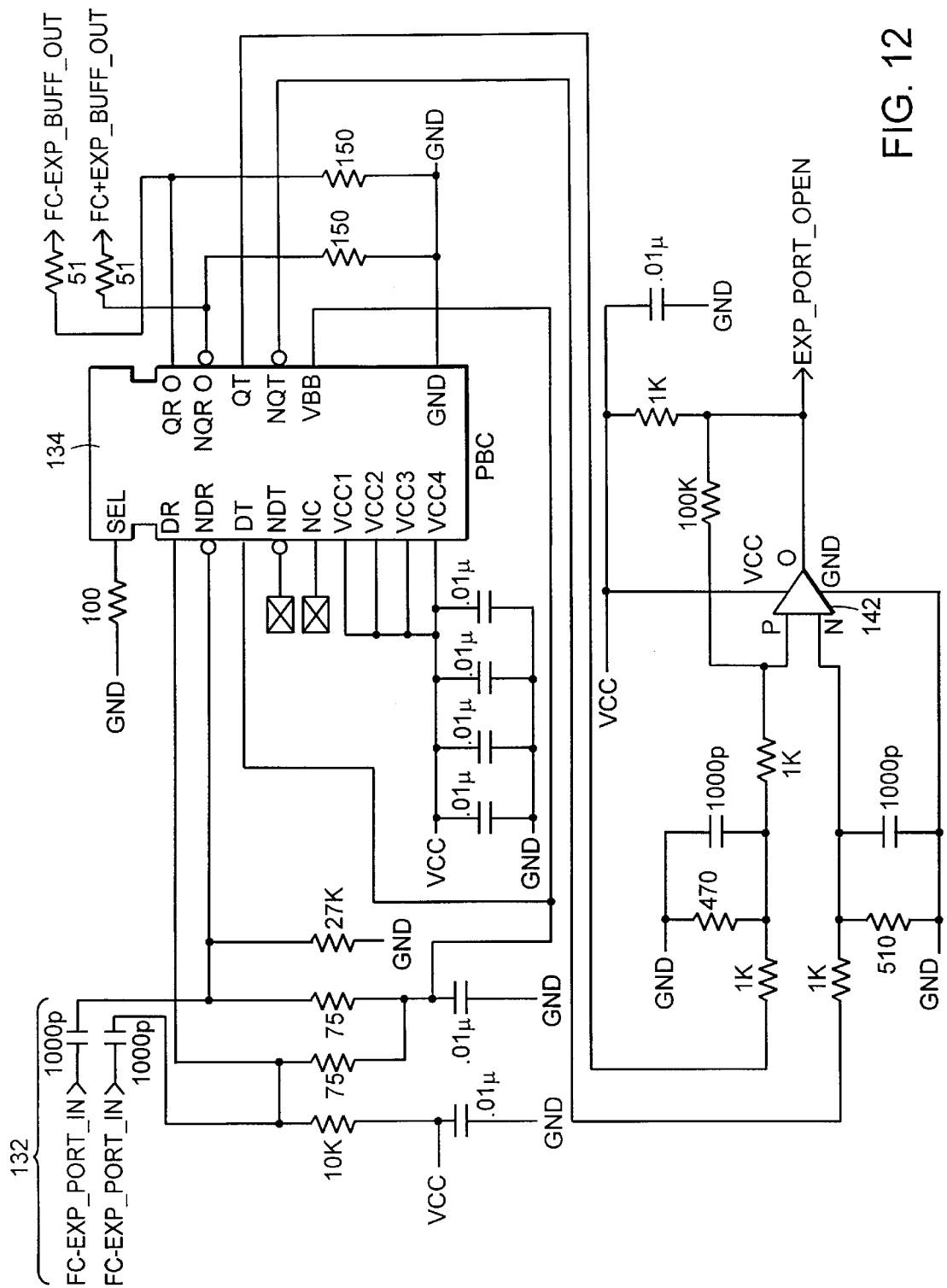
FIG. 12 is a schematic circuit diagram of the high frequency signal input portion of a diplexer for use in the disk array chassis of FIG. 1.
Figure 13:
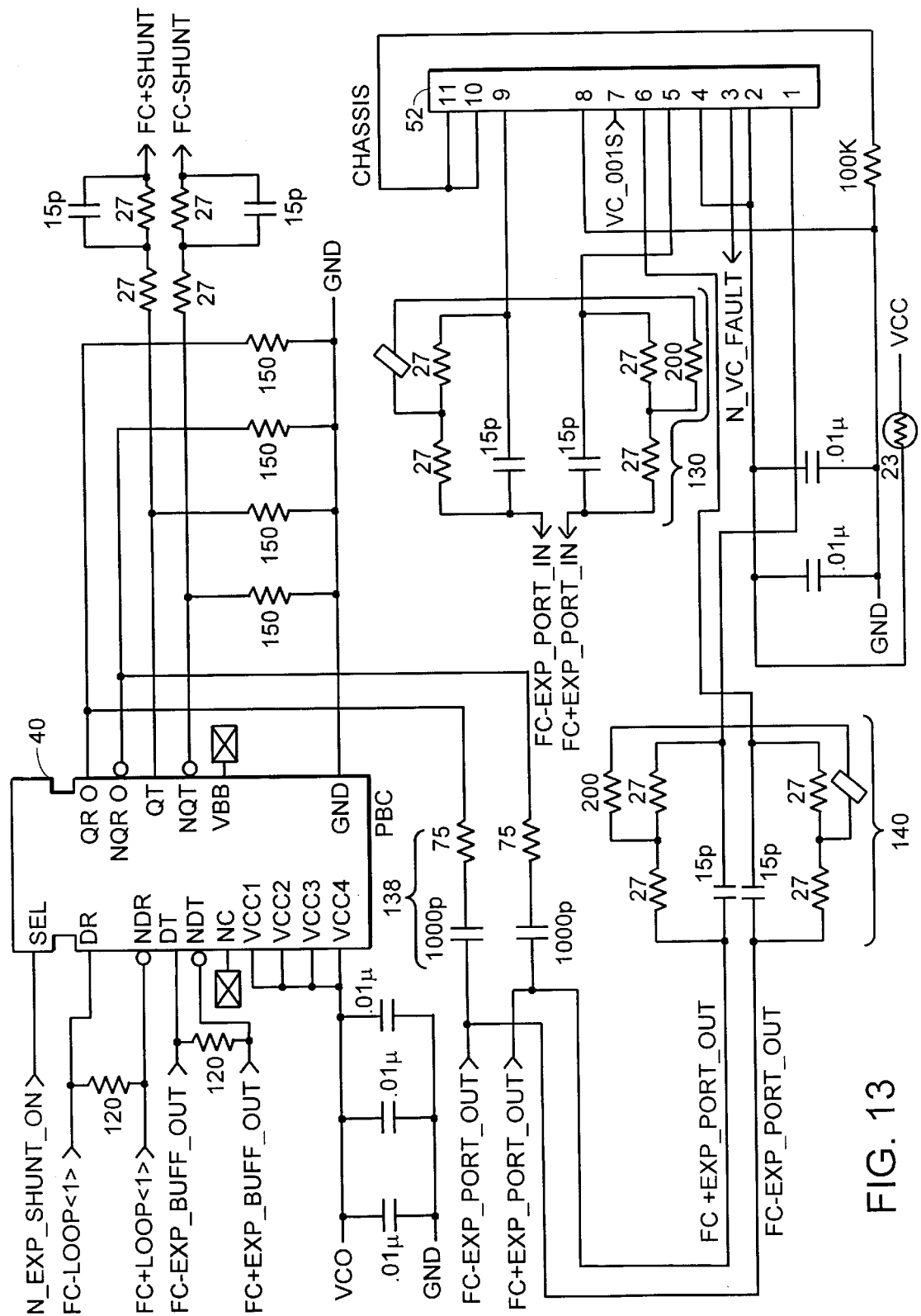
FIG. 13 is a schematic circuit diagram of the high frequency signal output portion, a shunt and an expansion connector for use in the disk array chassis of FIG. 1.

Referring now to FIGS. 11–13, the common mode coupling embodiment of a diplexer 50 is shown in greater detail. The RS-232 type low frequency signal output is provided to an inverter with hysteresis input 120. The signal is then passed through a low pass filter 122. The low pass filtered signal is then common mode coupled onto the twinax cable. The return signals are summed at a node 124 where both returning signals are connected. The summed signal is low pass filtered by capacitors 126 connected to ground. The summed and filtered signal is provided to a receiver 128 which in the presently preferred embodiment is an LM 393 dual comparator.

Referring to FIG. 13, the expansion connector 52 is shown. A DB9 connector is the presently preferred cable connector 52. Signals received on the connector are passed through an equalizer 130. The received signals are then passed to the low frequency input portion of FIG. 11B and the high frequency input portion of FIG. 12 which will now be described. The high frequency input portion passes the received signals through a high pass filter 132. A port bypass circuit 134 then acts as a differential receiver. The differential receiver acts as a subtractor looking at the difference between the received signals. The resulting high frequency signals are passed through the port bypass circuit 134 to the shunt 40 and to a signal detector 142. The output of the signal detector 142 may be used to allow the shunt 40 to remain in its normal state when no signals are detected. When a signal is detected the shunt 40 may assume its switched state if authorized by the environmental monitor.

The received signals that are passed through the shunt 40 continue onto the serial bus 24 represented by the FC-SHUNT signals. Outgoing high frequency fibre channel signals are provided by serial bus 22 represented by the FC-LOOP signals. The outgoing signals are driven through the shunt 40. Depending upon the state of the shunt 40, these signals will either loop back to the serial bus 24 on the FC-SHUNT lines or proceed towards the cable connector 52. The signals sent to the cable connector 52 are differentially driven by shunt 40. One signal is inverted and the other noninverted. The inverted and noninverted signals are passed through a high pass filter 138. Thereafter, the fibre channel signals are combined with the low frequency signals from the low frequency output portion of the diplexer to produce a sum of the high and low frequency signals and a difference between the low and high frequency signals. The sum and difference signals may then be passed through an equalizer 140 before they reach the cable connector 52.

We claim:

1. A computer communication link comprising:

a first computer component including a differential coupling which differentially couples a Fibre Channel signal onto a first pair of conductors;

a cable including said first pair of conductors therein;

a second computer component further including an environmental monitor to detect status of a plurality of conditions within said second computer component; and a communication path passing through said cable for connection to said environmental monitor so that proper connection of said cable and thereby said first pair of conductors to said second computer component can be determined from signals on said communication path.

2. The computer communication link of claim 1 wherein said communication path comprises common mode coupled signals on said first pair of conductors and wherein said cable includes a grounded sheath.

3. The computer communication link of claim 1 wherein said communication path is carried on at least one conductor within said cable separate from the first pair of conductors.

4. A diplexed computer communication link comprising:

a first computer component including a differential coupling which differentially couples a first signal onto a first pair of conductors;

a grounded sheath having said first pair of conductors pass therethrough;

said first computer component further including a common mode coupling which common mode couples a second signal onto the first pair of conductors; and a second computer component including a diplexer having a high pass filter and a low pass filter coupled to the first pair of conductors for separately extracting the first signal and the second signal from the first pair of conductors.

5. The computer communication link of claim 4 wherein the first signal comprises a Fibre Channel signal.

6. The computer communication link of claim 4 wherein the diplexer further includes an adder for retrieving the second signal.

7. The computer communication link of claim 4 wherein the diplexer further includes a subtractor for retrieving the first signal.

8. The computer communication link of claim 4 further comprising a second pair of conductors within said grounded sheath and wherein said second computer component includes a differential coupling which differentially couples a third signal onto the second pair of conductors and a common mode coupling which common mode couples a fourth signal onto the second pair of conductors.

9. The computer communication link of claim 8 wherein the first pair of conductors and the second pair of conductors are arranged orthogonal to one another.

10. The computer communication link of claim 8 wherein said first computer component includes a diplexer having a high pass filter and a low pass filter coupled to the second pair of conductors for separately extracting the third signal and the fourth signal from the second pair of conductors.

11. A method for communicating between computer components comprising:

differential coupling a Fibre Channel 8B/10B encoded signal in a first computer component onto a first pair of conductors within a grounded sheath;

coupling a low frequency data signal in the first computer component onto the first pair of conductors to produce a composite signal; and low pass filtering the composite signal in a second computer component so as to attenuate the Fibre Channel signal.

12. The method of claim 11 further comprising providing a twinax cable connected between the first computer component and the second computer component, the twinax cable including the first pair of conductors and a second pair of conductors arranged orthogonal to the first pair of conductors wherein signals are transmitted along the second pair of conductors from the second computer component to the first computer component.

13. The method of claim 11 wherein the step of coupling a low frequency data signal in the first computer component comprises common mode coupling.

14. The method of claim 13 further comprising adding the signals received on one of the conductors in the first pair of conductors to signals received on the other of the conductors in the first pair of conductors so as to retrieve the low frequency data signal.

15. The method of claim 11 wherein the step of coupling a low frequency data signal in the first computer component comprises differential coupling.

16. The method of claim 11 wherein the low frequency data signal provides an information channel between the first computer component and the second computer component independently from the Fibre Channel 8B/10B encoded signal.

17. The method of claim 11 wherein said step of coupling the low frequency data signal further includes reducing slew rate of the low frequency data signal.

18. A method for communicating between computer components comprising:

differential coupling a Fibre Channel 8B/10B encoded signal in a first computer component onto a first pair of conductors within a grounded sheath;

coupling a low frequency data signal in the first computer component onto the first pair of conductors to produce a composite signal; and high pass filtering the composite signal in a second computer component so as to attenuate the low frequency data signal.

19. The method of claim 18 further comprising providing a twinax cable connected between the first computer component and the second computer component, the twinax cable including the first pair of conductors and a second pair of conductors arranged orthogonal to the first pair of conductors wherein signals are transmitted along the second pair of conductors from the second computer component to the first computer component.

20. The method of claim 18 wherein the step of coupling a low frequency data signal in the first computer component comprises common mode coupling.

21. The method of claim 18 further comprising subtracting signals received on one of the conductors in the first pair of conductors from signals received on the other of the conductors in the first pair of conductors so as to retrieve the Fibre Channel signal.

22. The method of claim 18 wherein the step of coupling a low frequency data signal in the first computer component comprises differential coupling.

23. The method of claim 18 wherein the low frequency data signal provides an information channel between the first computer component and the second computer component independently from the Fibre Channel 8B/10B encoded signal.

24. The method of claim 18 wherein said step of coupling the low frequency data signal further includes reducing slew rate of the low frequency data signal.

* * * * *